United States Patent [19]

Maetani

[11] Patent Number: 5,153,636
[45] Date of Patent: Oct. 6, 1992

[54] READER PRINTER

[75] Inventor: Masami Maetani, Ageo, Japan

[73] Assignee: Canon Kabushiki Kaisha, Tokyo, Japan

[21] Appl. No.: 685,641

[22] Filed: Apr. 16, 1991

[30] Foreign Application Priority Data

| Apr. 17, 1990 [JP] | Japan | 2-99242 |
| Jun. 29, 1990 [JP] | Japan | 2-173947 |
| Dec. 7, 1990 [JP] | Japan | 2-407254 |

[51] Int. Cl.⁵ .......................................... G03B 13/28
[52] U.S. Cl. .................................. 355/45; 355/57; 355/58
[58] Field of Search ........................ 355/43, 45, 55–58

[56] References Cited

U.S. PATENT DOCUMENTS 5,049,923 9/1991 Sakakibara ............................ 355/45

FOREIGN PATENT DOCUMENTS 62-147446 7/1987 Japan .
63-142339 6/1988 Japan .

Primary Examiner—Richard A. Wintercorn
Attorney, Agent, or Firm—Fitzpatrick, Cella, Harper & Scinto

[57] ABSTRACT

When a film where a picture image is recorded in a vertical format is used in a reader printer with a horizontal type screen, the image rotating operation as well as the enlarging and reducing operations of the projected image, which should be changed over between the reader mode and the printing mode, may be performed easily through the operation of only one operation member.

24 Claims, 12 Drawing Sheets

F I G. 12
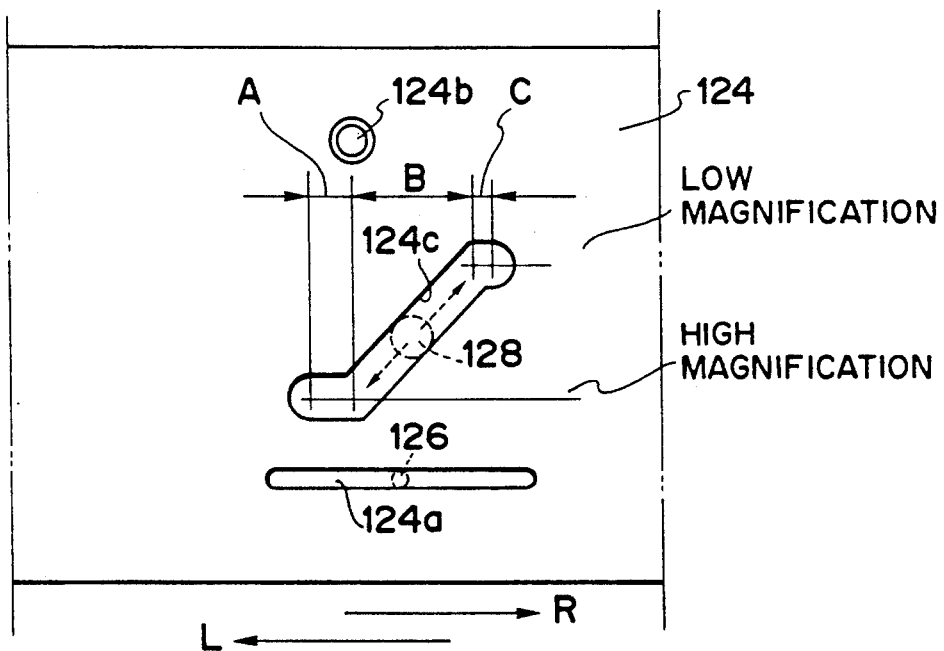

READER PRINTER

BACKGROUND OF THE INVENTION

1. Field of the Invention

The present invention relates to a reader and a reader printer for enlarging and projecting the picture information photographed on a microfilm or microfiche.

2. Related Background Art

When a microfiche film is used as a microfilm for documents in a reader printer which has a horizontal type screen like a horizontal A4 format, since the documents have been photographed in a vertical format with regard to the film, and as in FIG. 14A, the projected image Fa is vertical to the horizontal screen 10 of A4 size with the portion Fa' remaining out of the screen surface, it is impossible to see the overall image of the document image Fa so long as the document image in a vertical format is enlarged by such a magnification as to make it substantially equal to the size of the horizontal screen to be projected on the screen.

Consequently, it is necessary to prepare two different lenses, one for a high magnification and the other for a low magnification, and through the changeover of the lenses in a turret, the document is first reduced so that the overall image may be projected on the A4 size screen, then when carrying out printing, the lens being changed over with the high magnification lens, the film carrier is rotated 90°, or otherwise the image is made sideways to be a horizontal A4 by a prism.

In the above mentioned conventional system wherein the high and low magnification lenses are prepared and changed over in a turret, however, the film carrier is forced to move at the time of the changeover. Furthermore, since it is necessary to rotate the image 90° when printing, the operation to rotate the film carrier by 90° has to be carried out.

Also when a prism is used for the high magnification lens in the turret, the film carrier is moved as well with the changeover of the lenses, and when correcting this, the correction of the image using the prism is necessary, therefore the positioning of the film carrier turns out troublesome.

Accordingly, it has been tried to add a prism to a zoom lens.

More particularly, the projection operation system is equipped with a zoom lens and a prism for the image rotation, and using the low magnification side of the zoom lens (the magnification to reduce the longer length of A4 to the shorter length of A4 for the projection), the overall image of the document image in a vertical format is reduced and projected Fb (reduction zooming) so that it may remain vertical within the range between the top and the bottom of the horizontal screen 10 to be read as illustrated in FIG. 14B.

Next when carrying out the printing of the document image, first the zoom lens is changed over to the high magnification side (the magnification to enlarge the document image to the A4 size: enlargement zooming), then the position of the projected image is rotated 90° through the prism (90° image rotation) so that the enlarged and horizontal image projected Fc may stay within the horizontal screen 10 as in FIG. 14C. After that by pressing the printing button, printing is carried out.

By the above mentioned system, however, the operation steps for the printing;

(1) zooming operation for enlargement (Fb+Fa)
(2) 90° image rotating operation
(3) printing switch operation as well as the operations to read the next image after the printing:

(4) zooming operation for reduction
(5) 90° image rotating operation (return rotation) turn out troublesome, since they must be carried out manually by an operator in this order (steps (1) and (2) as well as steps (4) and (5) may be carried out in the reverse order).

SUMMARY OF THE INVENTION

The present invention is intended to solve the above mentioned problems of the conventional art; the object of the invention is to provide a projector device wherein the adjustment of the projecting magnification as well as the position adjustment of the projected picture image can be carried out through easy operations so that the picture image can be read and printed correctly regardless of film type.

Another object of the present invention is to provide a projector device wherein both the changeover of the projecting magnification and the image rotation can be carried out by the operation of a common operation member.

Still another object of the present invention is to provide a projector device wherein a series of the operation steps (1) to (5) described above are carried out automatically with improved operational performance.

To achieve the above mentioned objects, according to the present invention, it is characterized that the zoom lens and the prism are integrally constructed, that an interlock means which rotates the prism in association with the movement of a lever for zooming is provided, that the operational range of zooming is set to an angle range smaller than a predetermined angle, and that a region where only the prism is rotated without effecting zooming is provided on either side of start or completion of the enlargement by zooming.

Furthermore, according to the present invention a reader printer with a horizontal type projection screen is characterized in comprising an image projection means including a zoom lens and an image rotating member, interlocking means of the zoom lens with the image rotating member, which converts between a first state in which an image of the vertical format is projected in the vertical or upright state with low magnification on the projection screen with the entire height of the image being within the range between the top and the bottom of the horizontal screen and a second state wherein the image in the vertical format is rotated sideways and is projected with such a high magnification as to make it substantially equal to the size of the horizontal screen, drive means for driving said interlocking means, and control means for actuating said drive means in linkage with the printing switch operation on the printer side.

BRIEF DESCRIPTION OF THE DRAWINGS

FIG. 12 is a development of a sub tube.

DETAILED DESCRIPTION OF THE PREFERRED EMBODIMENTS

Figure 2:
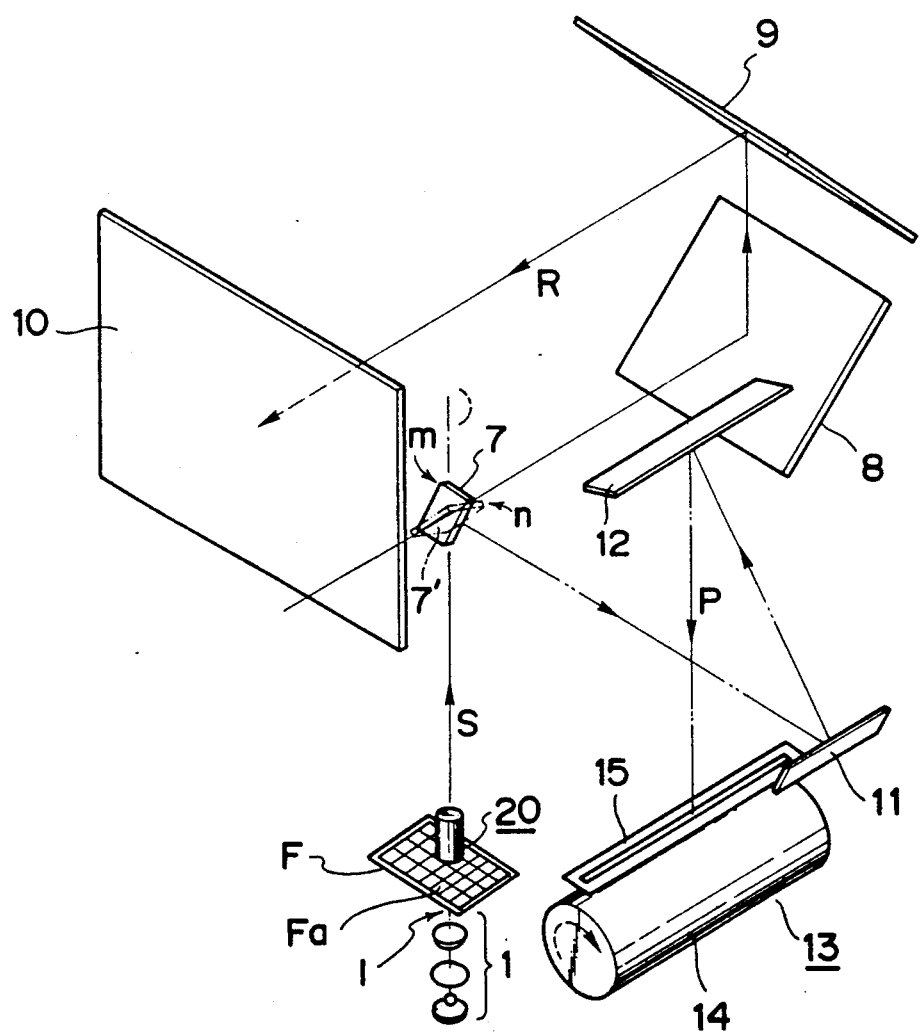
FIG. 2 is a schematic perspective view showing the optical path of a reader printer using microfilm.

FIG. 2 is a perspective view showing a schematic configuration of a microfilm reader printer in accordance with the present invention. 1 indicates a film illuminating portion comprising an illuminating lamp, a reflecting plate, a condenser lens, a field lens, and so on. F indicates a microfilm, and by moving manually a film carrier (not shown) which holds the film F, the picture image of the desired frame portion Fa is positioned in the illuminated area 1. 20 indicates a zoom lens with a prism to be used as a projection lens in the present embodiment. 7, 8 and 9 are respectively the first, the second and the third mirrors on the side of the optical path R in the reader mode. The first mirror 7 is opposed to the zoom lens 20 provided with a prism, and forms an optical path S. 10 indicates a projection screen of a horizontal A4 size. 7', 11 and 12 are respectively the first, the second and the third mirrors on the side of the optical path P in the printer mode. The second and the third mirrors 11, 12 are fixed mirrors, while the first mirror 7' is rotatable about the optical path S by an unshown changeover mechanism to change its position either into the position n indicated by the two-dot chain line or into the position m indicated by the continuous line. At the time of the changeover, the inclination of the first mirror 7' is always maintained 45° downward with regard to the horizontal plane. Furthermore, the first mirror 7' is driven to rotate for scanning, being synchronized with the rotation of a photosensitive drum 14 as a recording medium. 13 indicates a printer mechanism such as a transfer type photocopying mechanism. In FIG. 2, only the photosensitive drum 14 and a slit plate 15 are shown as the assembly members of the printer mechanism 13. However, the printer mechanism 13 further comprises assorted image processing equipment installed at important positions around the photosensitive drum 14 etc.

In the reader mode, the first mirror 7' on the optical path side P in the printer mode changes its position by 90° automatically from the position n indicated by the two-dot chain line in FIG. 2 into the position m of the first mirror 7 indicated by the continuous line on the optical path side R in the reader mode, where it stops and is maintained to constitute the reader mode optical path R. That is to say, an optical path in the reader mode R which starts from the film illuminating portion 1 and, via prism provide the zoom lens 20, the first mirror 7, the second mirror 8, and the third mirror 9, leads to the screen 10 is constructed so that the overall picture image of the desired frame searched for and positioned on the film illuminating portion 1 can be enlarged and projected on the projection screen 10 as a still picture.

In the printer mode, the first mirror 7 on the optical path side R in the reader mode changes its position by 90° automatically from the position m indicated by the continuous line in FIG. 2 into the position n of the first mirror 7' indicated by the two-dot line on the optical path side P in the printer mode, where it stops and is maintained. In this way the printer mode optical path P is constructed, that is to say, an optical path in the printer mode P, which starts from the film illuminating portion 1 and, via the zoom lens 20, the first mirror 7', the second mirror 11, the third mirror 12, and the slit plate 15, leads to the photosensitive drum 14, is constructed.

Figure 9:
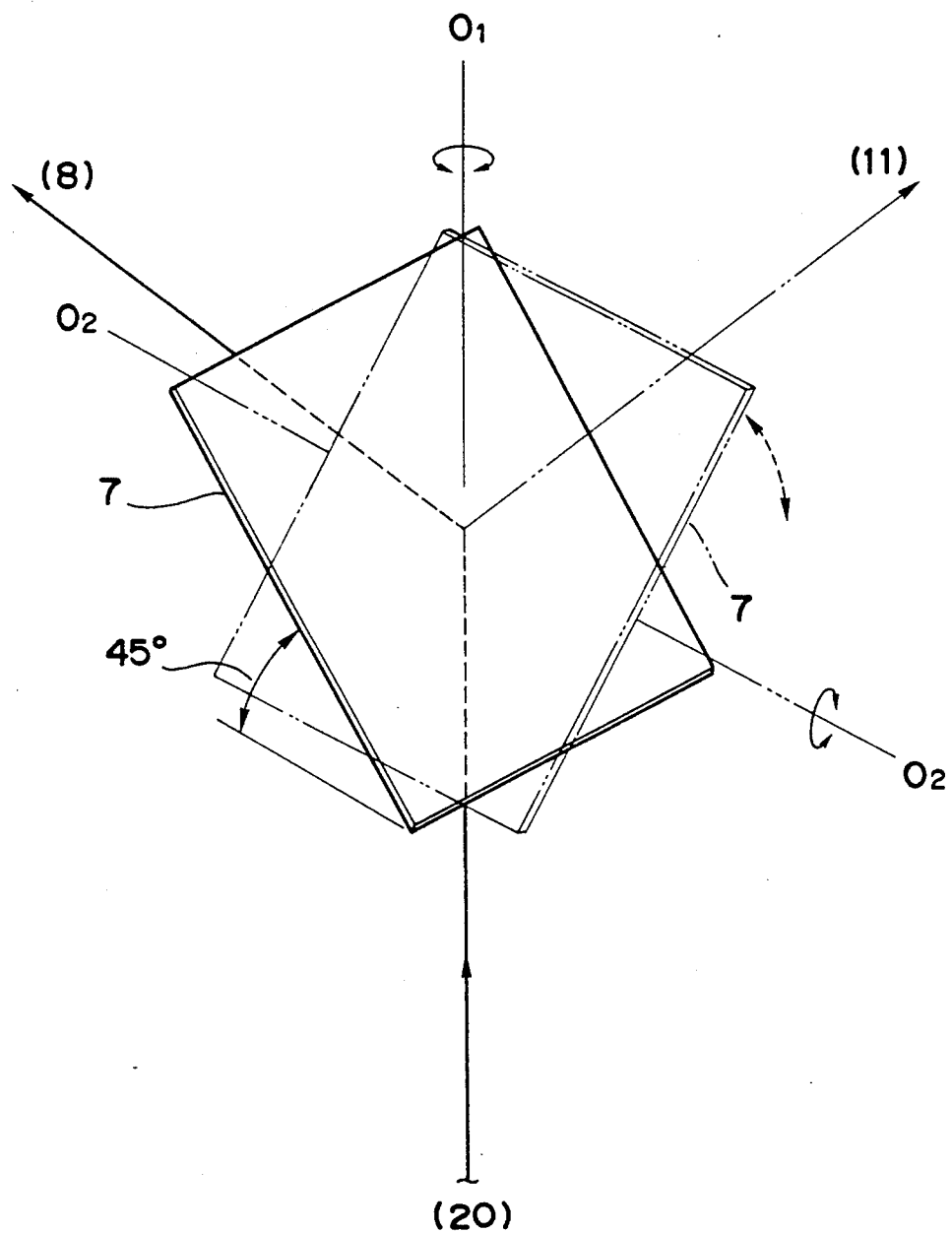
FIG. 9 is a drawing to explain the position change of the first mirror.

FIG. 9 is to explain the position change of the first mirror 7. In the printer mode, the first mirror 7 is rotated clockwise by 90° about the vertical line $O_1$ to change its position into the second position (indicated by the two-dot chain line), where it reflects light coming from the projection lens 20 toward the second mirror 11 on the side of the printer mode, and is held to construct a printer optical path which starts from the film illuminating position and, via the projection lens 20, the first mirror 7', the second mirror 11, the third mirror 12, and the slit plate 15, leads to the rotating photosensitive drum 14.

The printer mechanism portion 13 in the present embodiment is a mechanism wherein a transfer type electronic photo process is utilized and is equipped with a charging device, a developing device, a transfer device, a cleaning device and so on around the rotating photosensitive drum 14. Furthermore, it comprises a paper feed portion and necessary process equipment such as a fixing device. All of the peripheral equipment have a configuration well known among the art, so they are not illustrated in the drawing.

When the first mirror 7 is moved into second position to effect printing, the first mirror 7 is driven to rotate (light image scanning rotation) about a transverse axis $O_2$ at a predetermined constant revolution speed with synchronized with the revolution peripheral speed (surface travel speed) of the photosensitive drum 14 so that light coming from the projection lens 20 may be scanned and the picture image of the desired microfilm frame may be exposed through the slit on the surface of the rotating photosensitive drum 14 to carry out the enlarged printing.

The shuttle rotational changeover mechanism of the first mirror 7 position between the first and the second position as well as the scanning rotation mechanism of the second position is also left out in the drawing.

When the position of the first mirror 7 is changed to the printer mode optical path P side as described above, the first mirror 7' is driven to rotate around the optical path S at a specified isometric speed synchronized with the revolution speed (surface travel speed) of the photosensitive drum 14. Due to this scanning rotation of the first mirror 7', the projected image of the object frame picture image portion Fa of microfilm F is exposed through the slit on the peripheral surface of the photosensitive drum 14 via the first mirror 7', the second mirror 11, the third mirror 12, and the slit plate 15, and an enlarged copy corresponding to the object frame picture image Fa comes out from the printing mechanism 13.

Figure 1:
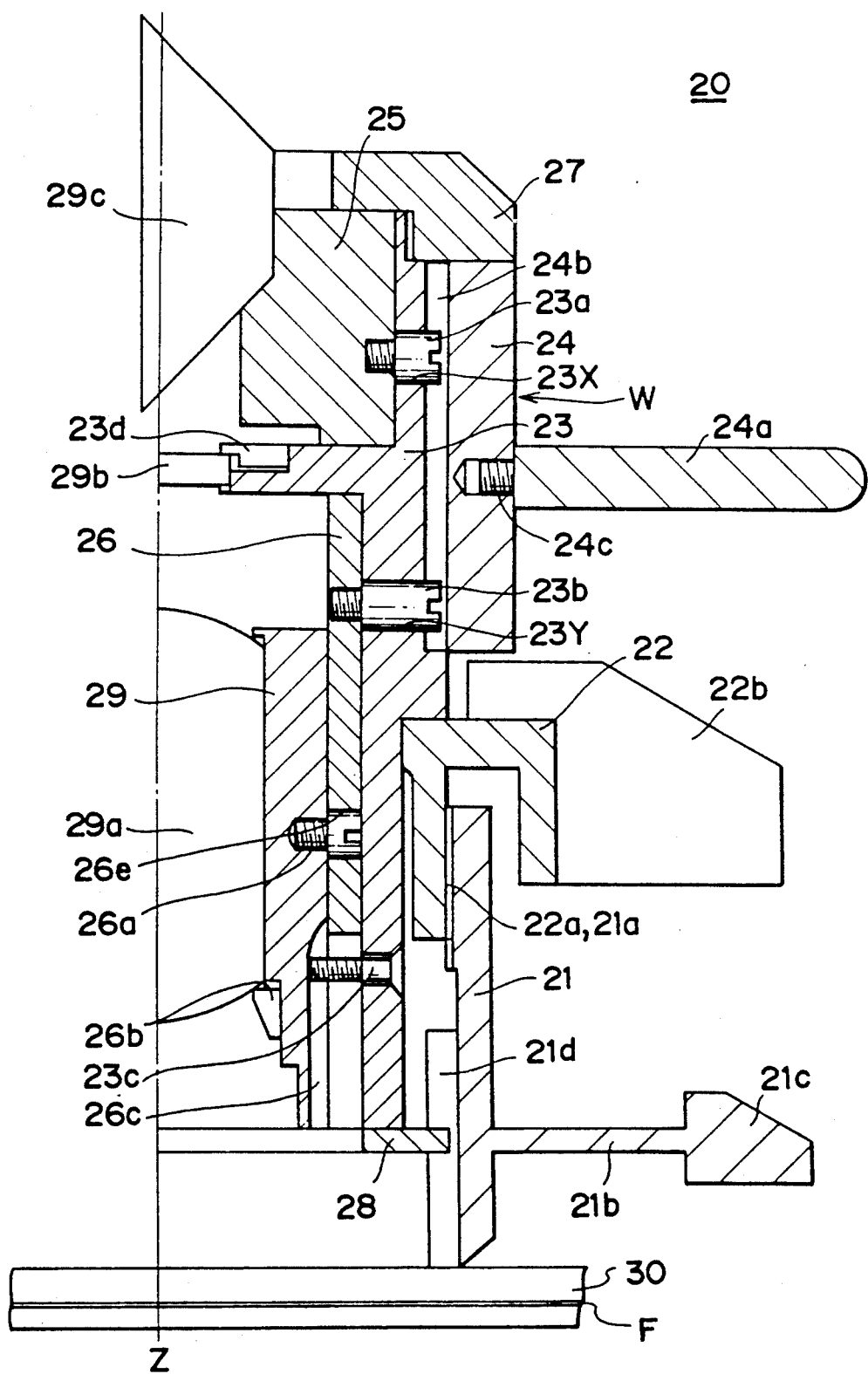
FIG. 1 is a cross section of a zoom lens with a prism in accordance with the present invention.
Figure 3:
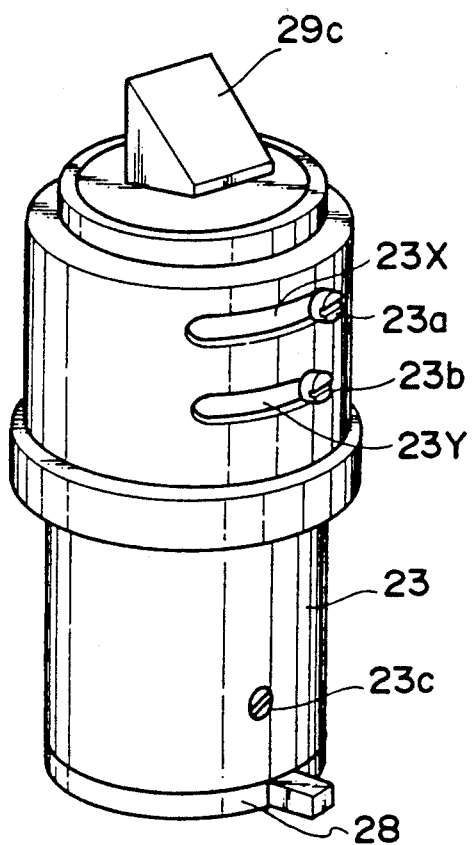
FIG. 3 is a partial perspective view of the lens with a prism.
Figure 4:
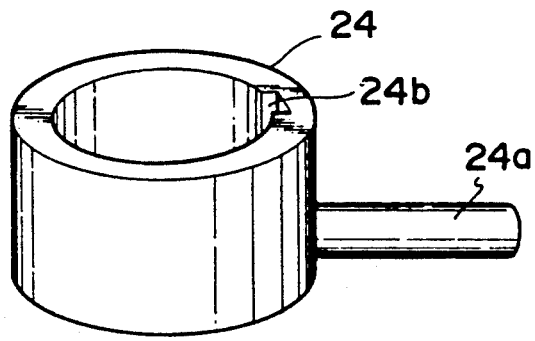
FIG. 4 is a perspective view of the ring 24.

FIG. 1 is a cross section of a zoom lens 20 provided with a prism, representing an embodiment of the present invention. In the drawing, 21 indicates a lens holding outer cylinder which secures the entire zoom lens while pressing this toward the surface of a pressure plate glass 30, and 21a indicates a helicoid provided with a female thread. 21b is a spring portion which is made of elastic material whose thickness is reduced to have elasticity, and 21c is a lens retaining circular portion, whose position is fixed by means of an unshown concavo-convex engagement portion. 21d indicates a concave groove formed inside the lens holder outer cylinder 21, which engages with a rotation stopper 28 in a concavo-convex engagement manner. 22 indicates a lens holder inner cylinder which engages with the lens holder outer cylinder 21 through the helicoids 21a, 22a to adjust the height of the zoom lens 20. 22b is a radially provided blade, which is rotated with a finger to adjust the height of the lens holder inner tube 22. 23 indicates a first barrel which holds the entire zoom lens 20, and is formed with guide grooves 23X, 23Y as shown in FIG. 3; 23X is the guide groove to control the travel angle of a pin 23a fixedly attached to a prism fixing block 25. The travel angle is set to a predetermined value, in case of the present embodiment, to a value larger than 45°. 23Y is the guide groove to control the travel angle of a pin 23b fixed to a second barrel 26 and the travel angle is set to a value larger than 45°. 23c indicates a guide pin which guides along a concave groove 26c formed in third barrel 29. 23d is a lens presser to settle a lens 29b, and 24 is a ring which has a groove 24b with a concave cross section and engages with the pins 23a, 23b to transfer rotation to the pins 23a, 23b. 24a is a lever for zooming, fixed to the ring 24 by a screw 24c. By rotating the lever 24a, zooming and the rotation of a prism 29c can be carried out. A prism fixing block 25 (a second support member) for fixing the prism 29c and the first barrel 23 are constructed so as to rotate freely. Here the screw 24c, the ring 24, the ring groove 24b, the pin 23a, and the prism fixing block 25 constitute together an interlock mechanism W, through which the rotational movement of the lever 24a is transmitted to the prism 29c. A perspective view of the ring 24 and the lever 24a is shown in FIG. 4.

A lens group 29a is contained in a third barrel 29, and the third barrel 29 is in turn contained in the second barrel 26 (a first support member). Here 26a indicates a pin which joins the third barrel 29 with the second barrel 26.

Figure 5:
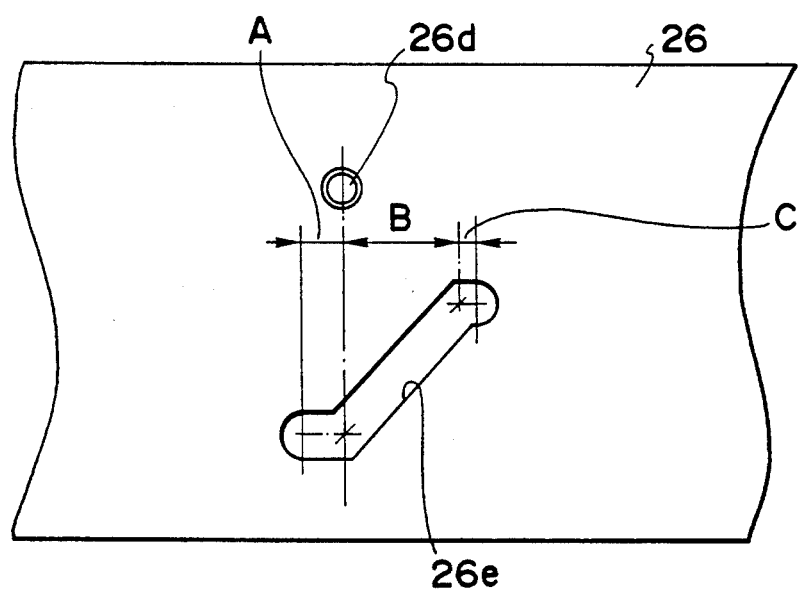
FIG. 5 is a development of a cam groove for zooming.

FIG. 5 shows a development of the second barrel 26. 26d is a tap to receive the pin 23b which transmits torque to the second barrel 26. 26e is a cam groove to guide the pin 26a fixed to the third barrel 29.

26b in FIG. 1 is a lens presser for positioning the lens group 29a at the third barrel 29, and 27 is a presser ring which prevents the prism fixing block 25 from being removed.

Figure 6A:
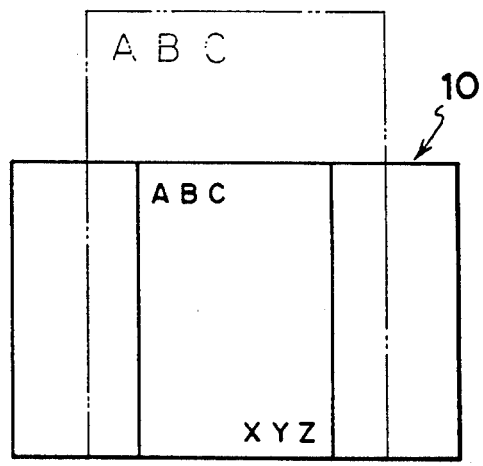
FIGS. 6A and 6B are drawings to explain the image on the screen.
Figure 6B:
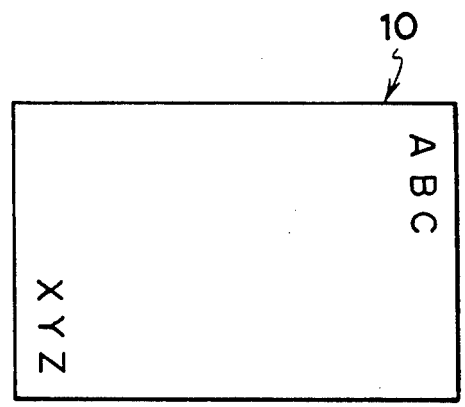

Next, when microfilm F of a format for documents is projected on the horizontal screen 10 of A4 size in the above mentioned configuration, it is impossible to project the overall image onto the screen 10 as indicated by the two-dot chain line in FIG. 6A. Therefore, using the low magnification end of the zoom lens 20 (magnification to reduce the longer length of A4 format to the shorter length of the format), the overall image of the document is projected on the screen 10. At this time, by rotating the blade 22b in FIG. 1, the entire zoom lens 20 with the prism is moved up and down with regard to the microfilm F to adjust the focus. In order to correct the tilting of the image, the lever 24a is rotated within a horizontal portion C. When the lever 24a is moved along the horizontal portion C of the cam groove 26e of the second barrel 26 illustrated in FIG. 5, since the lens group 29a does not change its position, only the prism 29c rotates, and accordingly the image projected on the screen 10 is rotated, thus enabling the correction of the tilting of the image. Here the horizontal portion C, provided on the side or end where enlargement is completed, is a region for the prism rotation only.

Next, to carry out printing, it is necessary to perform the operation for restoring the reduced projecting magnification as well as the operation for rotating the projected image by 90°. In the present embodiment, it is possible to carry out these two operations through the rotational movement of only one lever 24a; when rotating the lever 24a toward the enlargement completion side where enlargement is completed, the ring 24 begins to rotate, and two pins 23a, 23b engaged with the ring groove 24b rotate also. The pin 23a transmits the movement of the lever 24a directly to the prism 29c to rotate this, and the pin 23b transmits the movement of the lever 24a to the lens group 29a via the second tube 26, moving the lens group 29a to carry out zooming. The range to carry out zooming while rotating the prism 29c corresponds to the inclined portion B indicated in FIG. 5. The inclination of the inclined portion B is set to a value smaller than 45°. In the configuration of the cam groove 26e, because it comprises the horizontal portions A, C, it is enough to rotate the prism 29c by 45° in order to rotate the image by 90°, that is to say, the horizontal portions A, C are provided as the adjustment portions of the tilting of the image, since the inclination of the inclined portion to carry out zooming while rotating the prism is set to a value smaller than 45°. Here the horizontal portion A, provided on the enlargement beginning side of zooming, is a region only for the prism rotation.

The 90° image rotation and zooming can be carried out with only one lever in this way. Moreover, the fine adjustment of the image rotation can be carried out also with the same lever.

In the embodiment above described, the image projecting magnification is changed using a zoom lens. However, it may be so constituted that the projecting magnification may be changed through the exchange of lenses or the change of the length of the optical path.

Figure 7A:
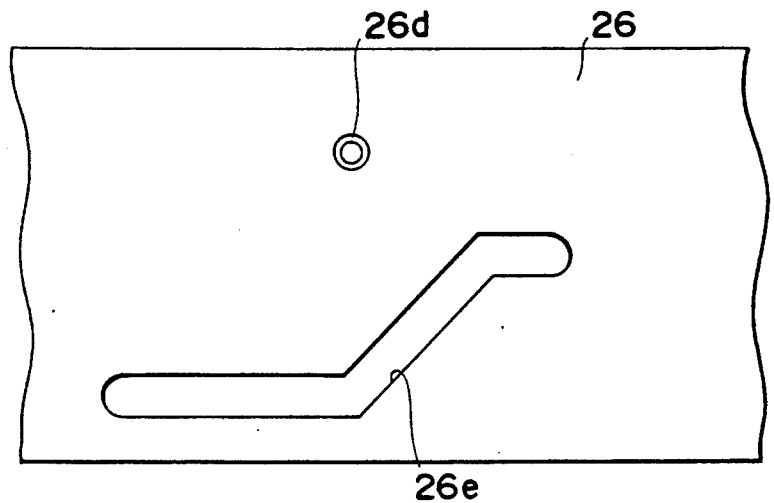
Figure 7B:
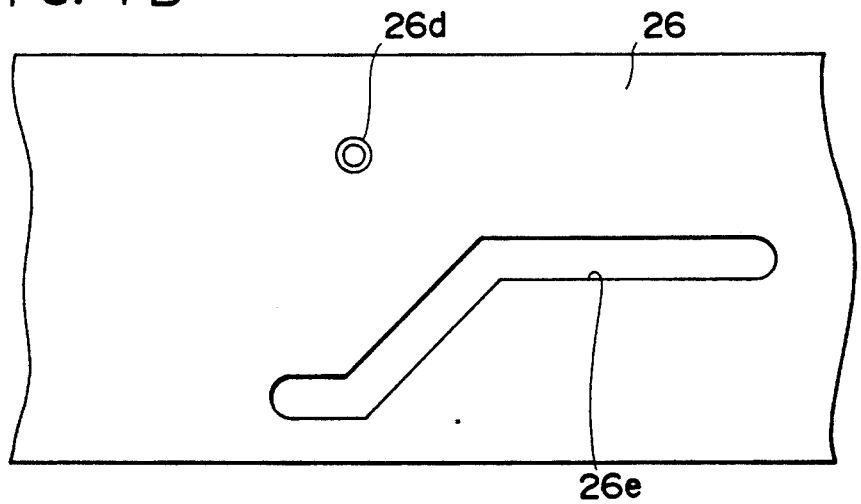
Figure 7C:
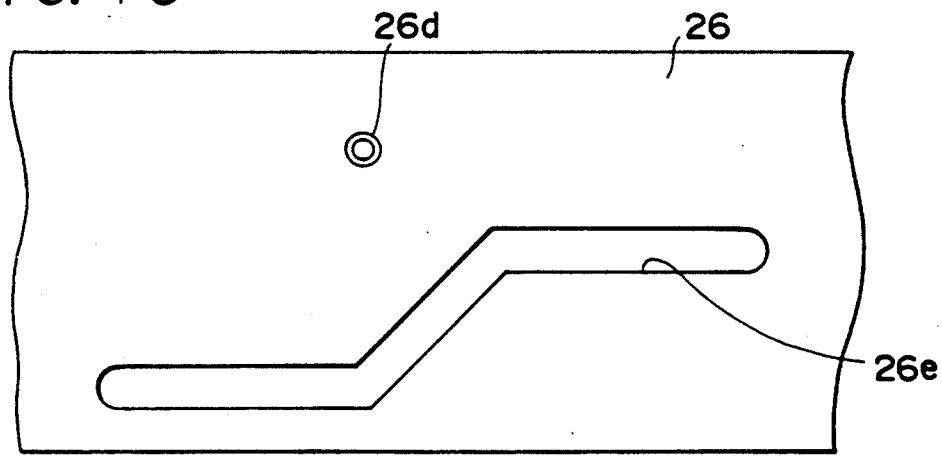

As another embodiment of a cam groove, as shown in FIGS. 7A to 7C, it may be so constructed as to comprise a long horizontal portion on one side and a short horizontal portion on the other side, or long horizontal portions on both sides, with the inclination of the cam groove being less than 45°.

As described above, due to the region only for the prism rotation provided on either side of the enlargement beginning or completing, it is possible to carry out zooming while rotating the prism, as well as the fine adjustment of the prism rotation, with only one lever for zooming, thus enabling to provide a zoom lens with a prism which is superior in the operational performance.

Figure 8:
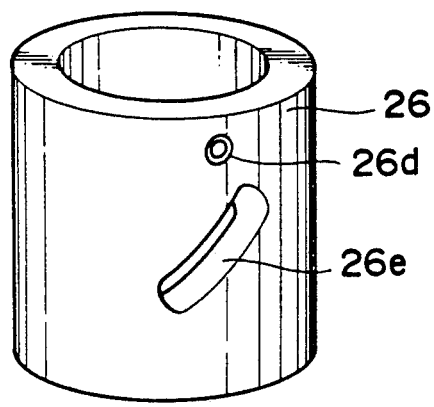
FIGS. 7A to 7C and 8 are drawings showing another embodiment of a cam groove for zooming.

In still another embodiment of a cam groove, as shown in FIG. 8, it may also be so constructed that no horizontal portion is provided at the upper or the lower end portion of the cam groove 26e of the second tube 26.

The present invention has the effect to improve the operational performance; the prism rotation and the zooming lens movement are carried out at the same time with one operation lever as described above, thus performing the two operations without any difficulty.

Figure 10:
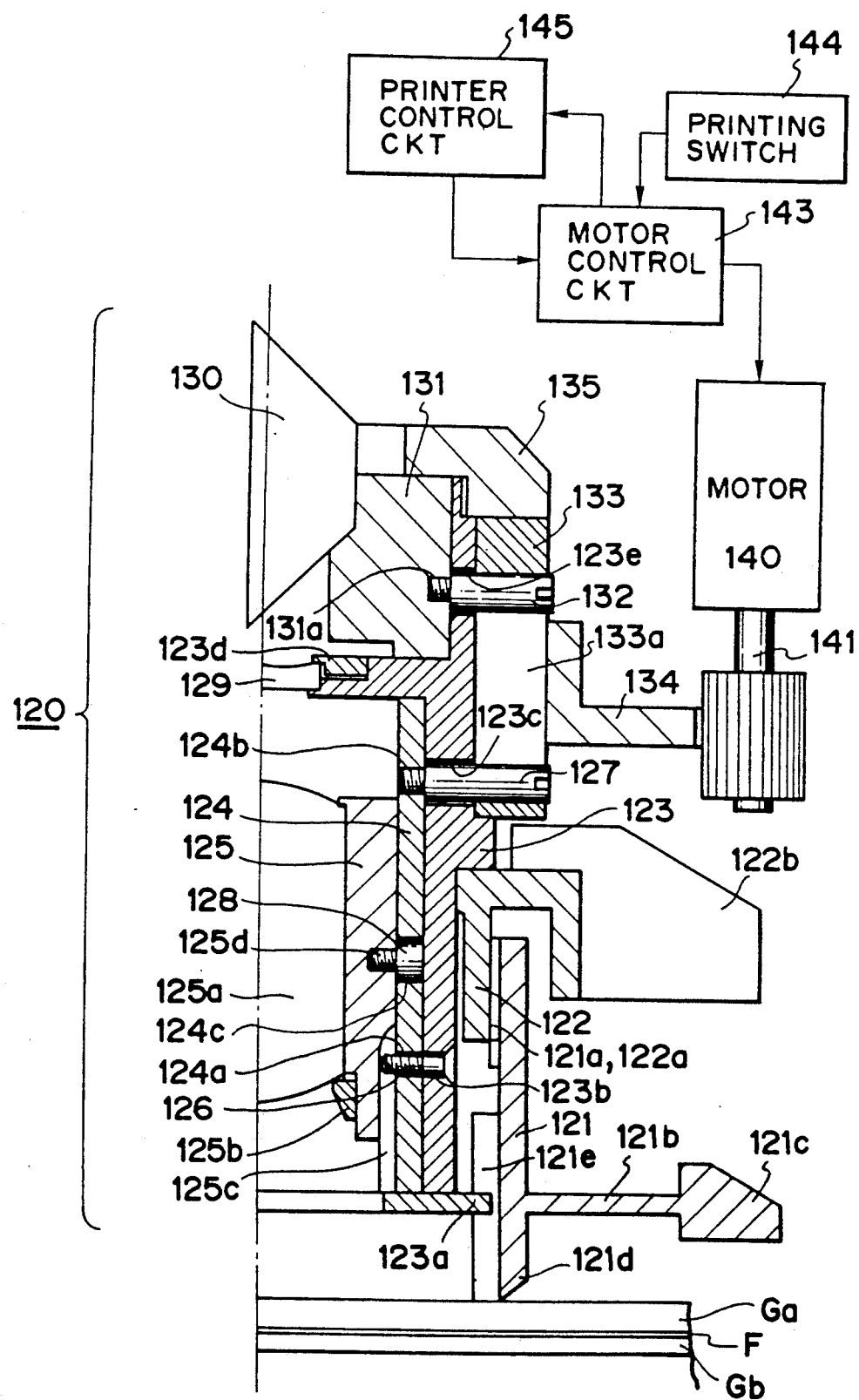
FIG. 10 is a longitudinal section showing another embodiment of a projection lens with a prism.

Another embodiment of a projection lens is shown in FIG. 10, which is a longitudinal cross section of a left half portion of a projection lens 120 in the condition attached to a lens holder 121, 122.

The lens holder comprises an outer cylinder 121 and an inner cylinder 122 which is engaged with the outer cylinder through helicoids 121a, 122a. 121b is a spring portion provided on the outer surface of the outer cylinder 121 made of elastic material whose thickness is reduced to have elasticity. 121c is a circular holder retaining portion provided at the end of the spring portion. By fixing the position of the retaining portion 121c through a not illustrated concave-convex engagement portion of the apparatus body, the outer cylinder 121 is unrotatably attached to the apparatus body.

Furthermore, the outer cylinder 121 is pressed to move downward due to the elasticity of the spring portion 121b, hitting against the upper surface of an upper pressure glass plate Ga of an upper and lower pair of pressure glass plates Ga, Gb on the side of a film carriage and being received by this, and is held in a close contact condition with it. The upper and lower pair of the pressure glass plates Ga and Gb are displaced horizontally underneath the outer cylinder 121 in accordance with the operation to move the carriage while keeping the close contacting condition with the outer cylinder 121 so that the desired picture frame of microfilm F clasped between the upper and the lower pressure glass plates Ga, Gb may be searched or retrieved to position itself within the opening of the outer case 121.

The inner cylinder 122 engaged with the outer cylinder 121 through the helicoids 121a, 122a is displaced up and down with regard to the outer cylinder 121 through the horizontal rotating operation of the thumb blade plate 122b provided on the inner tube 122.

The projection lens 120 is attached to the inner cylinder 122 of the lens holder with its lower half portion being inserted in it. Consequently, the projection lens 120 is displaced up and down together with the inner cylinder 122 with regard to the outer cylinder 121 due to the vertical movement of the inner cylinder 122 with regard to the outer cylinder 121. This operation to move the projection lens 120 up and down by the inner cylinder 122 corresponds to the focusing operation.

The projection lens 120 is equipped with a zooming function and an image rotating function. In the projection lens 120, 123 indicates a main barrel, 124 is a sub barrel inserted in the main barrel, and 125 is a zoom lens barrel inserted in the sub barrel. 125a indicates a zoom lens group provided in the zoom lens barrel 125, and 125b indicates a lens presser to position the lens group 125a inside the barrel 125.

121e is a longitudinal concave groove provided on the inside of the outer cylinder 121, and 123a is a rotation preventing protrusion provided integrally with the main barrel 123 at its lower end, which engages with the longitudinal concave groove 121e of the outer cylinder 121. Due to this concavo-convex engagement, the main cylinder 123 is allowed to move up and down with regard to the lens holder 121, 122, but it is prevented from moving rotatably in a circumferential direction.

On the contrary, the sub barrel 124 can freely rotate crosswise with regard to the main barrel 123 which is prevented from rotating as described above.

The zoom lens barrel 125 is allowed to move up and down with regard to the sub barrel 124, but is prevented from moving rotatably in a circumferential direction due to the insertional engagement of the tip portion of a guide pin 126 with a longitudinal concave groove 125c provided on the outside of the zoom lens barrel 125. The guide pin 126 is screwed into a tapped hole 123b made in the main tube 123, with its tip portion being inserted into the longitudinal concave groove 125c of the zoom lens tube 125 to engage with this through a circumferential long hole 124a provided in the sub barrel 124.

127 indicates a pin for rotating the sub barrel 124 left and right, the threaded tip portion of which is screwed tightly into a tapped hole 124b made in the sub barrel 124 through a first circumferential long hole 123c made in the main barrel 123, to be constituted integrally with the sub barrel 124.

128 is a cam pin for displacing the zoom lens barrel 125 vertically up and down inside the sub barrel 124 (zooming movement), with its threaded portion being screwed into a tapped hole 125d made in the zoom lens barrel 125 to be integral with the barrel 125, and with its head portion being engaged with the inside of a helical cam hole 124c formed in the sub barrel 124.

129 indicates a fixed lens group other than the movable zoom lens group 125a, being provided above the zoom lens group 125a inside the main barrel 123 and positioned by a lens presser 123d.

130 is a prism for the image rotation provided above the said lens group 129, and 131 is a prism fixing block for supporting the prism, which is able to move rotatably along the inner peripheral surface of the main barrel 123.

132 indicates a pin for the leftward and rightward rotation of the prism fixing block 131, with its threaded tip portion being screwed tightly into a tapped hole 131a made in the prism fixing block 131 to be integral with the prism fixing block 131.

133 is an operation ring for the rotative movement, which is fit rotatably over the upper half portion of the main barrel 123 and has a longitudinal long hole 133a. The pin 127 for the left and right rotative movement of the sub barrel 124 and the pin 132 for the left and right rotative movement of the prism fixing block 131 are inserted in and engaged with this longitudinal long hole 133a. Accordingly, by turning the ring 133 left and right, the pins 127, 132 are pressed to move horizontally, causing the left and right rotative movement of the sub barrel 124 and the prism fixing block 131.

134 is a gear and operation member for drive transmission fit over the ring 133 to be integral with it. 135 indicates a presser ring screwed onto the upper end side of the main barrel 123 to prevent the prism fixing block 131 and the ring 133 from removing out. The drive transmission gear 134 is able to be manually operated to rotate like the operation lever 24a in FIG. 1.

140 is a drive motor such as a pulse motor, and 142 indicates a power gear, which is fixed to the drive shaft 141 of the motor and engages with the drive transmission gear 134 of the ring 133. 143 is a motor control circuit for controlling the motor 140, 144 is a printing switch, and 145 is a printer control circuit to control a printer.

When performing manually the zooming operation of the zoom lens and the operation for rotating the prism, after the motor 140 is made inoperative, the gear 134 can be rotated manually.

Figure 11:
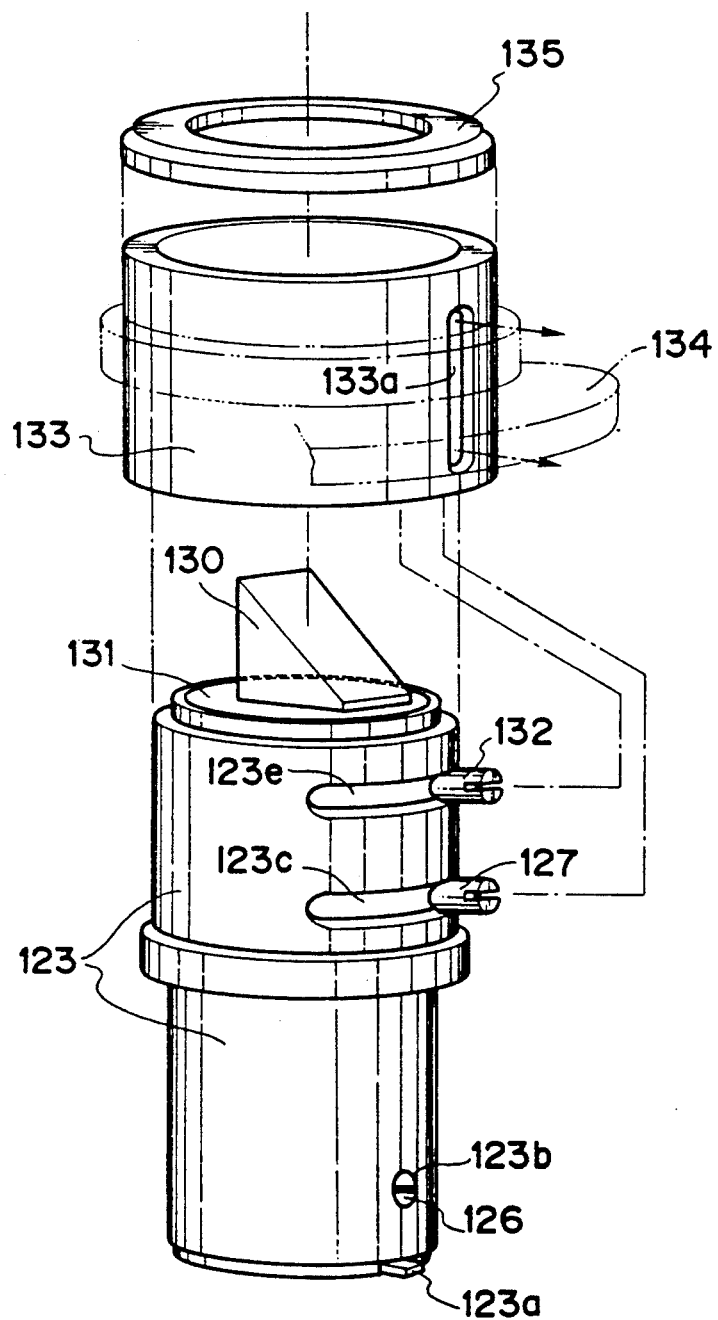
FIG. 11 is an exploded perspective view of the projection lens.

FIG. 11 is an exploded perspective view of the main barrel 123, the ring 133, and the presser ring 135, and FIG. 12 shows a development of the sub barrel 124.

In the above description, the ring 133, the pins 127, 132, the sub barrel 124, the helical cam hole 124c, the cam pin 128, the zoom lens barrel 125, and the prism fixing block 131 constitute an interlock means for moving both the zoom lens 125a and the prism 130 as an image rotating member at the same time with each other, and the motor 140 together with the gears 142, 134 constitute a drive means for driving the interlock means. Also, the circuits 143, 145 are control means for actuating the drive means in association with the operation of the printing switch 144.

When the sub barrel 124 is rotated rightward R (FIG. 12), due to the helical cam hole 124c, the cam pin 128, the guide pin 126, and the longitudinal concave groove 125c, the zoom lens barrel 125 moves downward inside the sub barrel 124. The direction of this downward movement is toward the high magnification side. When the cam pin 128 reaches the lower end of the helical cam hole 124c, the barrel 125 is not lowered any more and the zoom lens 125a is located at a position with the highest magnification (where the image is enlarged to A4 size and projected on the screen 10 in the present embodiment).

When the sub barrel 124 is rotated to left L (FIG. 12), contrary to the above description, the zoom lens barrel 125 is raised inside the sub barrel 124. The direction of this upward movement is toward the low magnification side. When the cam pin 128 reaches the upper end of the helical cam hole 124c, the tube 125 is not lifted up any more and the zoom lens 125c is located at a position with the lowest magnification (where the longer length of A4 format is reduced to be equal to the shorter length of the format in the present embodiment).

Figure 14A:
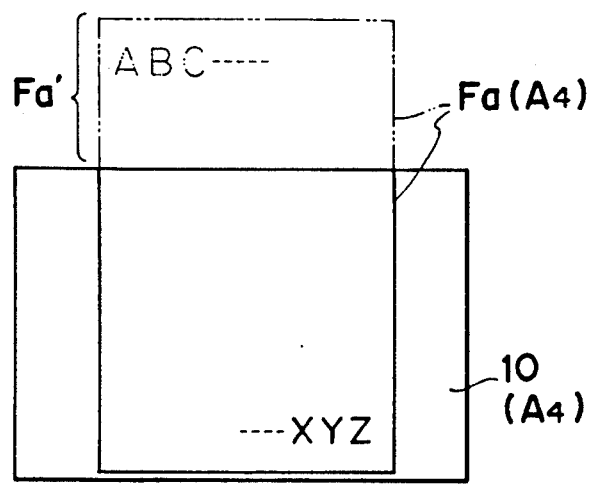
FIGS. 14A to 14C are drawings to explain the change in the projecting magnification and in the projected position in the reader mode and in the printing mode.
Figure 14B:
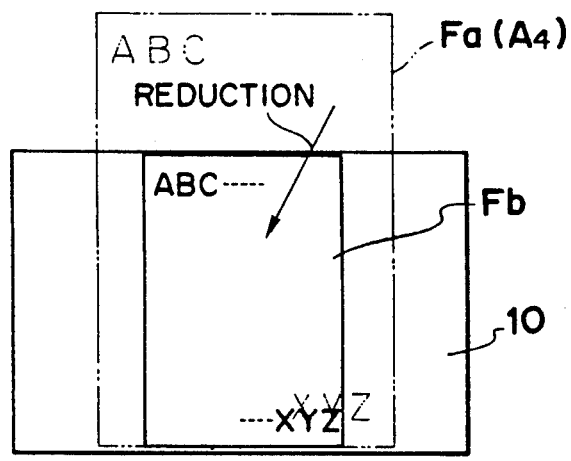

Now in FIG. 10, let it be supposed that the ring 133 should be rotated to left, the zoom lens barrel 125 to be raised inside the sub barrel 124, and the zoom lens 125a to be located at the highest magnification position. Also, the prism fixing block 131 should be rotated to the left due to the left rotation of the ring 133, and the prism 130 to be located at a selective rotating position as to project the image upright with regard to the screen. In this condition, the picture image in a vertical format of the object microfilm frame searched for and positioned in the illuminated position is, as in FIG. 14B, projected on the horizontal screen 10 (A4 size) as a reduced image Fb which contains vertically the overall picture image within the region between the top and the bottom of the screen 10. Under this condition, through the operation for moving the inner barrel 122, or the projection lens 120, up and down with regard to the outer case 21 using the thumb blade plate 122b of the inner tube 122 of the lens holder when necessary, the focusing of the projected image Fb on the screen 10 is carried out so that the projected image Fb may be read.

Next when carrying out printing, it is necessary to perform the operation for enlarging the projected image Fb to substantially the same size as the screen 10 of an A4 size as well as the operation for rotating the projected image sideways by 90°. In the present embodiment, these two operations are carried out automatically by pushing the printing button 144 and succeedingly the printing operation is carried out.

More particularly, when the printing switch 144 is turned on, the motor 140 is driven normally by a predetermined angle through the motor control circuit 143, and the ring 133 is rotated to right via the gears 142, 134. With this, interlocking with the right rotation of the sub barrel 124, the zoom lens barrel 125 moves downward inside the sub barrel 124. When it reaches the highest magnification position, then the normal drive of the motor 140 by the predetermined angle comes to completion, and the motor stops. Also in accordance with the right rotation of the ring 133, the prism fixing block 131 is rotated to right, and the prism 130 is changed into a position with such a rotation angle as to project the image 90° sideways with regard to the screen.

Figure 14C:
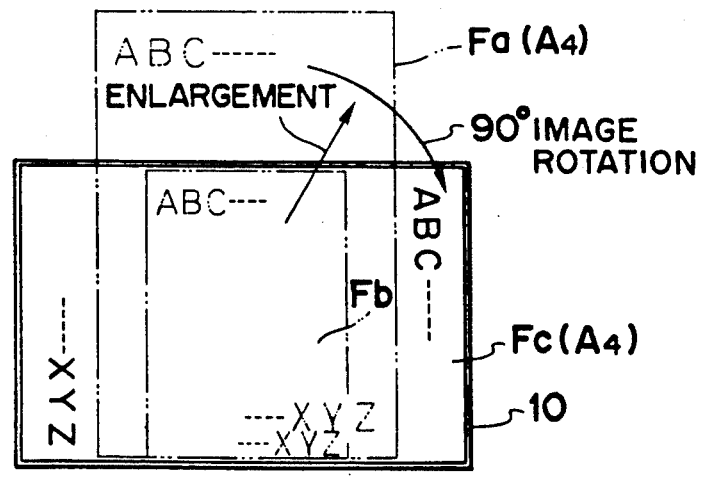

In this way, the image to be projected on the horizontal screen 10 is, as in FIG. 14C, automatically converted into an enlarged horizontal image Fc of the substantially same size as the screen 10 which stays horizontally within the screen.

After being brought to this condition, the motor control circuit 143 sends a printing signal to the printer control circuit 145 to actuate the printer mechanism 113, and printing of the enlarged A4 size picture image of the desired frame is carried out.

When printing is completed, the printer control portion 145 sends a printing completion signal to the motor control circuit 143 to drive the motor 140 reversely by the predetermined angle. When this ring 133 is rotated to left, the zoom lens 125a is restored to its lowest magnification position, and the prism 130 is returned to its position for the upright projection so that the image to be projected on the screen is automatically restored to its condition before the printing button 144 is pushed as in FIG. 14B.

In succession, the next desired picture frame of microfilm is retrieved for and positioned in the illuminated position, and when printing is required, then by pressing the printing button 144, the same action as above is repeated automatically.

In the main barrel 123, the length of the first circumferential long hole 123c as well as that of the second circumferential long hole 123c, through which the pins 127, 132 extend respectively, is set to such a value as to limit the range of the rotating angle of the pins 127, 132 over 45°.

The helical cam hole 124c of the sub barrel 124 engages with a cam pin 128 to allow the vertical movement of the zoom lens barrel 125 between the low magnification side and the high magnification side. The cam pin 128 moves up and down within the range of the inclined portion B of the helical cam hole 124c (FIG. 12.) The rotating angle of the sub barrel 124 corresponding to this range B is made smaller than 45°. Also, the helical hole 124c comprises horizontal portions A, C at both the lower and the upper end portions of the inclined portion of the hole B in conjunction with this. Consequently, when the image is rotated by 90°, the prism 130 may be rotated by 45°, but since the rotating angle of the sub barrel 124 for zooming is set to less than 45° as described above, the horizontal portions of the hole A, C may be used as the adjusting portions of the tilting of the image.

Figure 13:
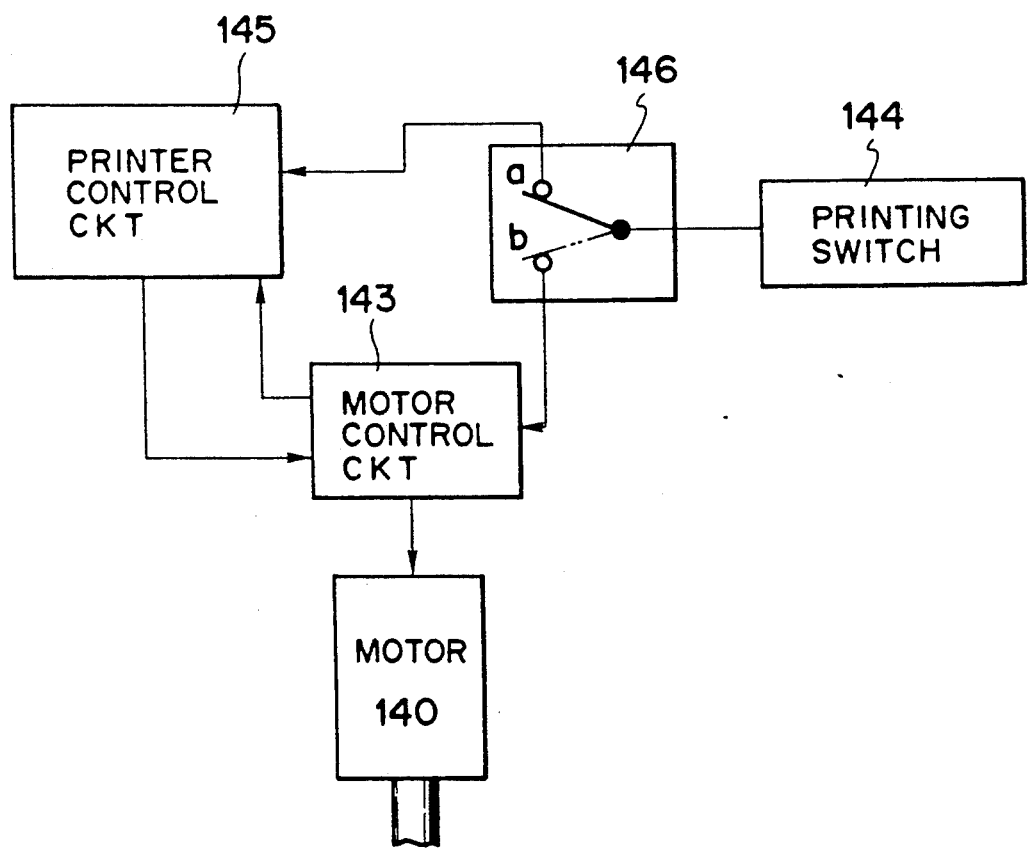
FIG. 13 is another block diagram of a motor control system.

In the above mentioned embodiment, the motor control circuit 143 is arranged between the printer control circuit 145 and the printing switch 144. However, as indicated in FIG. 13, the printing switch 144 may be connected with the motor control circuit 143 and the printer control circuit 145 via a changeover switch 146 so that the operating mode can be changed over between automatic and manual. In more detail, when the change-over switch 146 is connected with a contact a, the manual operating mode is selected, and, when the printing switch is turned on, the printer control circuit 145 is energized to carry out printing, without driving the motor 140. In this case, it is necessary to perform manually the 5 rotational operation of the gear 134 so that it may be located at a predetermined position before the printing switch is turned on. If the change-over switch 146 is connected with a contact b, the automatic mode is actuated in a circuit shown in FIG. 10.

In the above described manner, in accordance with the present invention, the operating performance at the time of printing may be greatly improved when a horizontal type screen is used and a projected image is in a vertical format.

What is claimed is:

1. A reader printer comprising:
   optical means for projecting a picture image recorded in film on a plane of projection, said optical means including magnification changing means for changing the magnification of the picture image to be projected on the plane of projection;
   image rotation means for rotating the picture image projected on the plane of projection;
   operation means for actuating said image rotation means to rotate the picture image by a desired angle; and
   first changeover means for changing between a connection state where, in accordance with operating said operation means, said image rotation means and said magnification changing means are actuated, and a nonconnection state where said image rotation means is actuated without actuating said magnification changing means.

2. A reader printer according to claim 1, wherein said magnification changing means includes a zoom lens.

3. A reader printer according to claim 1, wherein said image rotation means includes a prism.

4. A reader printer according to claim 1, wherein said first changeover means includes connection means which, when said operation means is operated in a first range, actuates said magnification changing means and said image rotation means, and which, when said operation means is operated in a second range, connects said operation means with said magnification changing means and said image rotation means.

5. A reader printer according to claim 1, further comprising a screen for observing the picture image and recording means for recording the picture image on a recording medium.

6. A reader printer according to claim 5, further comprising second changeover means for changing between a reader mode for projecting the picture image onto said screen and a printer mode for projecting the picture image onto said recording means.

7. A reader printer according to claim 6, wherein said magnification changing means is actuated to project the picture image on said screen with a first magnification in the reader mode and to project the picture image on said recording means with a second magnification which is higher than the first magnification in the printer mode.

8. A reader printer according to claim 1, further comprising drive means for driving said operation means, and command means for starting actuation of said recording means, and control means for actuating said drive means in accordance with the command of said command means.

9. A reader printer according to claim 1, further comprising a screen provided in a first plane of projection, and a photosensitive member provided in a second plane of projection, said optical means comprising a mirror for changing the optical path of the projected picture image of film selectively between said screen or said photosensitive member.

10. A reader printer comprising:
    a zoom lens to enlarge and project a picture image recorded in film;
    a first support member to support said zoom lens;
    a screen;
    a photosensitive member;
    optical path changeover means for projecting the picture image of film selectively either on said screen or on said photosensitive member;
    a prism to rotate the picture image projected either on said screen or on said photosensitive member;
    a second support member to support said prism;
    a manual operation member;
    a connection member for connecting said operation member with said first and second support members to change the projection magnification and rotate the projected image; and
    means for releasing connection of said operation member and said first support member.

11. A reader printer according to claim 10, further comprising drive means for driving said connection member.

12. A reader printer according to claim 11, wherein said drive means is a motor which can rotate in the forward and reverse directions.

13. A reader printer according to claim 10, wherein said connection member causes said first and second support members to move together in a first operation of said operation means and causes said second support member to move without said first support member in a second operation.

14. A reader printer according to claim 13, wherein said operation member is movable in a first range and in a second range.

15. A reader printer according to claim 14, wherein when said operation member moves in the first range the projection magnification changes between a maximum value and a minimum value and when said operation member moves in the second range the projection magnification is held at the maximum or minimum value.

16. A reader printer according to claim 10, further comprising a third support member for movably supporting said first and second support members and a second operation member for moving said third support member along an optical axis of said zoom lens.

17. An image projector device comprising:
    a screen;
    optical means for projecting an original image onto said screen with at least two different magnifications;
    image rotation means for rotating the image projected on said screen;
    a manually operated operation member;

a first connection means which, when said operation member is operated, actuates said image rotation means to rotate the projected image and interlock said image rotation means and said optical means to actuate said optical means to change the magnification of the projected image; and a second connection means for actuating, when the operation means is operated, said image rotational means without actuating said optical means.

18. A picture image projector device according to claim 17, further comprising recording means for recording the original image onto a recording medium, and second optical means for projecting the image to the recording medium.

19. An optical device for projecting an image of an original onto a screen and a recording medium, comprising:

a zoom lens for changing a projection magnification of the image of the original;

a prism for rotating the projected image by a desired angle;

first changeover means for changing over between a first mode for projecting the image of the original onto the screen and a second mode for projecting the image onto the recording medium;

control means for driving said zoom lens and said prism to project the image onto said screen with a first magnification when changed over to a first mode and to project the image onto the recording medium with a second magnification which is higher than the first magnification when changed to a second mode; and second changeover means for changing over between a state where said zoom lens and said prism are actuated together and a state where said zoom lens and said prism are not actuated together.

20. A reader printer comprising:

optical means for projecting an image onto a screen and a recording medium with a desired magnification;

magnification changeover means for changing a projection magnification of the image;

image rotation means for rotating the projected image;

interlocking actuating means for actuating said magnification changing means and said image rotation means together; and selecting means for selecting a first mode for driving said actuating means with a drive source and a second mode for manually driving said actuating means.

21. A device which is capable of projecting an image of an original onto a first projection plane and a second projection plane, comprising:

magnification changing means for changing a projection magnification of the image;

selection means for selectively projecting the image into either the first projection plane or the second projection plane;

image rotation means for rotating the projected image by a desired angle;

a manually operated operation member; and control means for actuating said magnification changing means and said image rotation means in accordance with a first operation of said operation means and for actuating said image rotation means without actuating said magnification changing means in accordance with a second operation of said operation member.

22. A device according to claim 21, wherein said operation member moves in a first region by the first operation and in a second region by the second operation.

23. A device according to claim 22, wherein during the second operation of said operation member said magnification changing means is held at a constant magnification value.

24. A device according to claim 23, wherein during the second operation of said operation member the constant magnification value is at a maximum or minimum.

* * * * *

UNITED STATES PATENT AND TRADEMARK OFFICE
CERTIFICATE OF CORRECTION

PATENT NO. : 5,153,636
DATED      : October 6, 1992
INVENTOR(S): Masami Maetani

It is certified that error appears in the above-indentified patent and that said Letters Patent is hereby corrected as shown below:

COLUMN 4:

Line 45, "with" should be deleted.

COLUMN 5:

Line 13, "concavo-convex" should read --concave-convex--.
    Line 16, "concavo-convex" should read --concave-convex--.

COLUMN 7:

Line 65, "concavo-convex" should read --concave-convex--.

COLUMN 8:

Line 55, "operation" should read --operational--.

COLUMN 11:

Line 11, "5" should be deleted.

Signed and Sealed this

Second Day of November, 1993

Attest:

BRUCE LEHMAN

*Attesting Officer*      *Commissioner of Patents and Trademarks*